Jan. 16, 1934. C. W. MOORE ET AL 1,943,618
DRYING FILTER
Filed Jan. 4, 1932 3 Sheets-Sheet 1
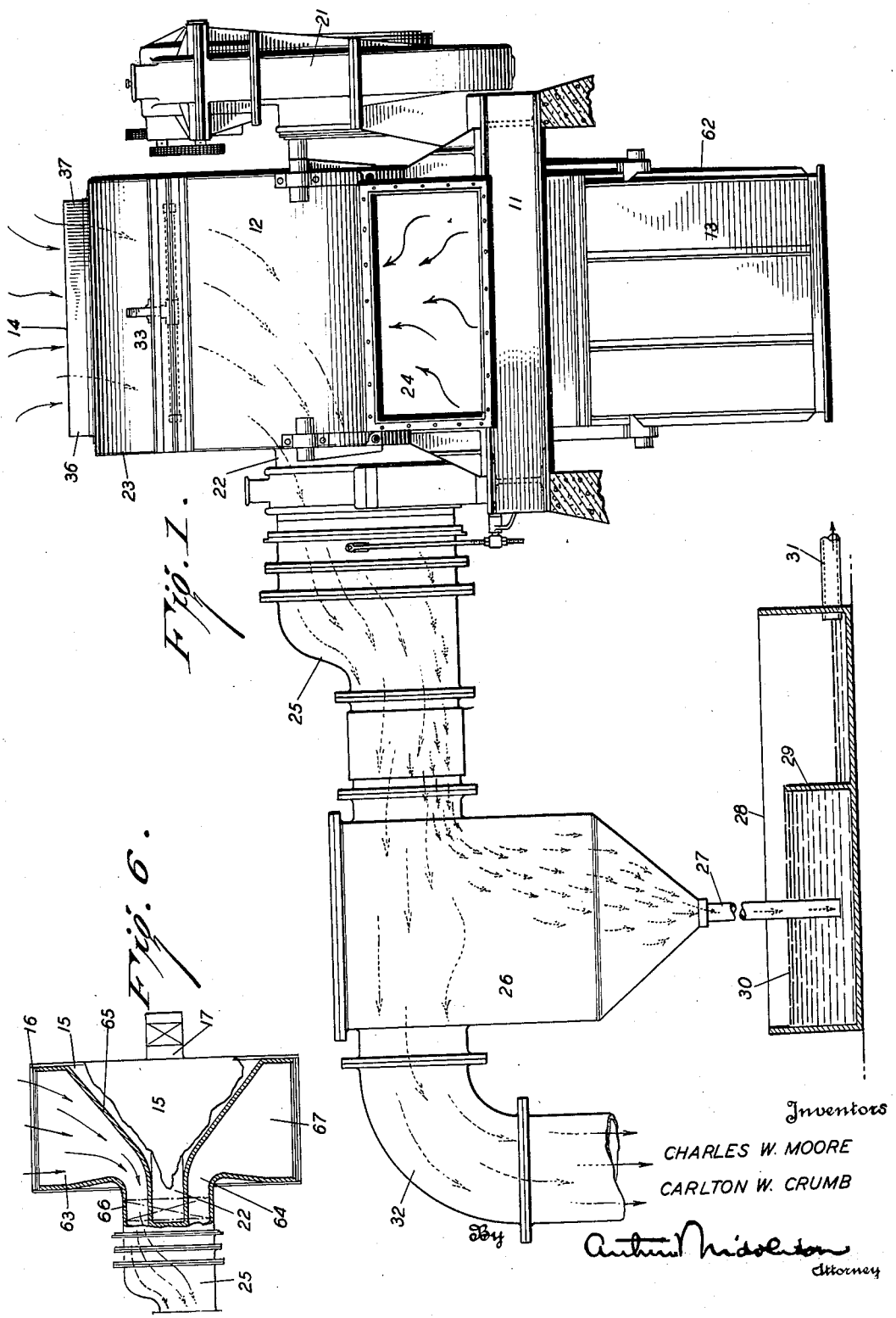
Inventors
CHARLES W. MOORE
CARLTON W. CRUMB
By Arthur Middleton
Attorney

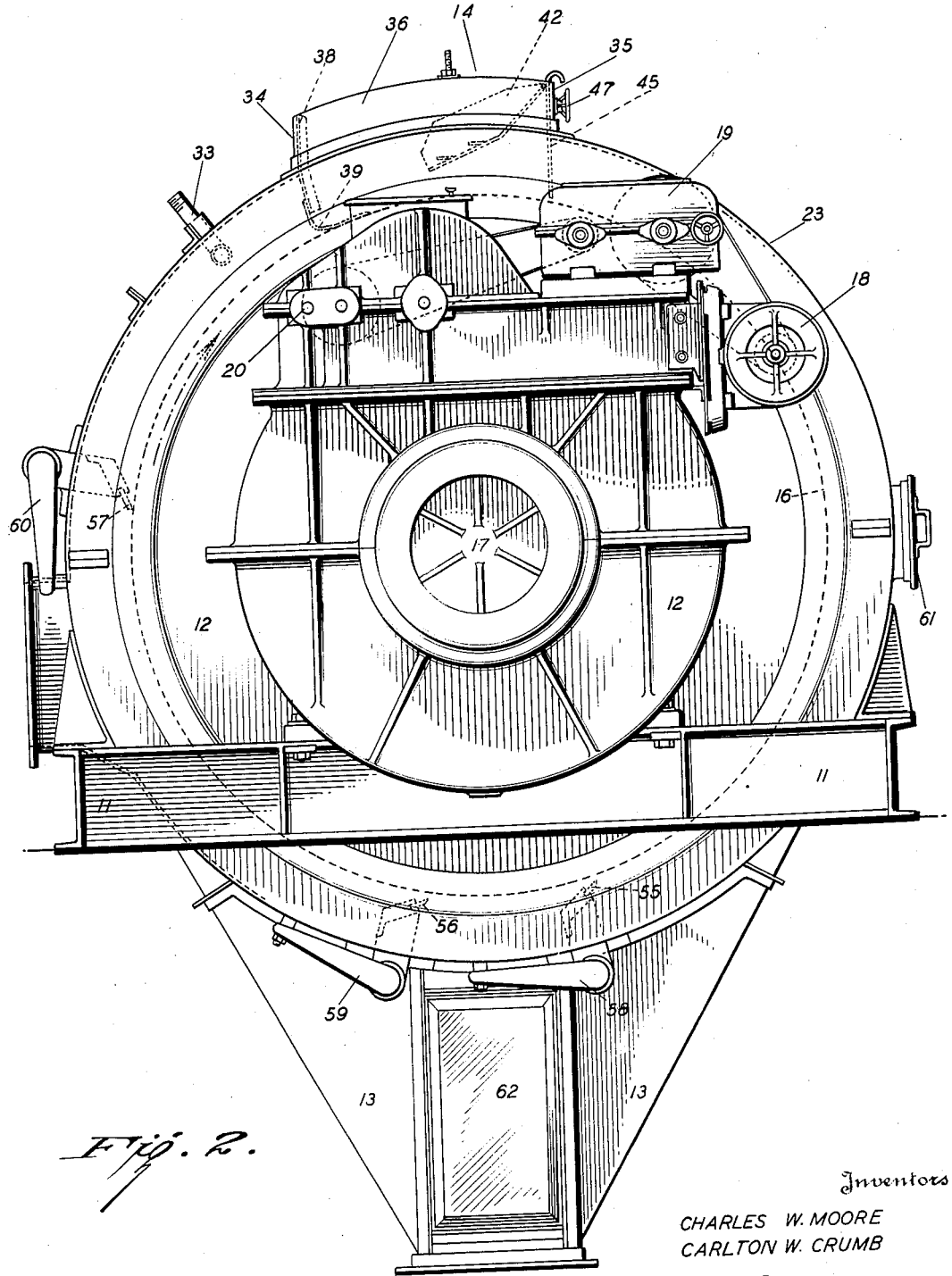

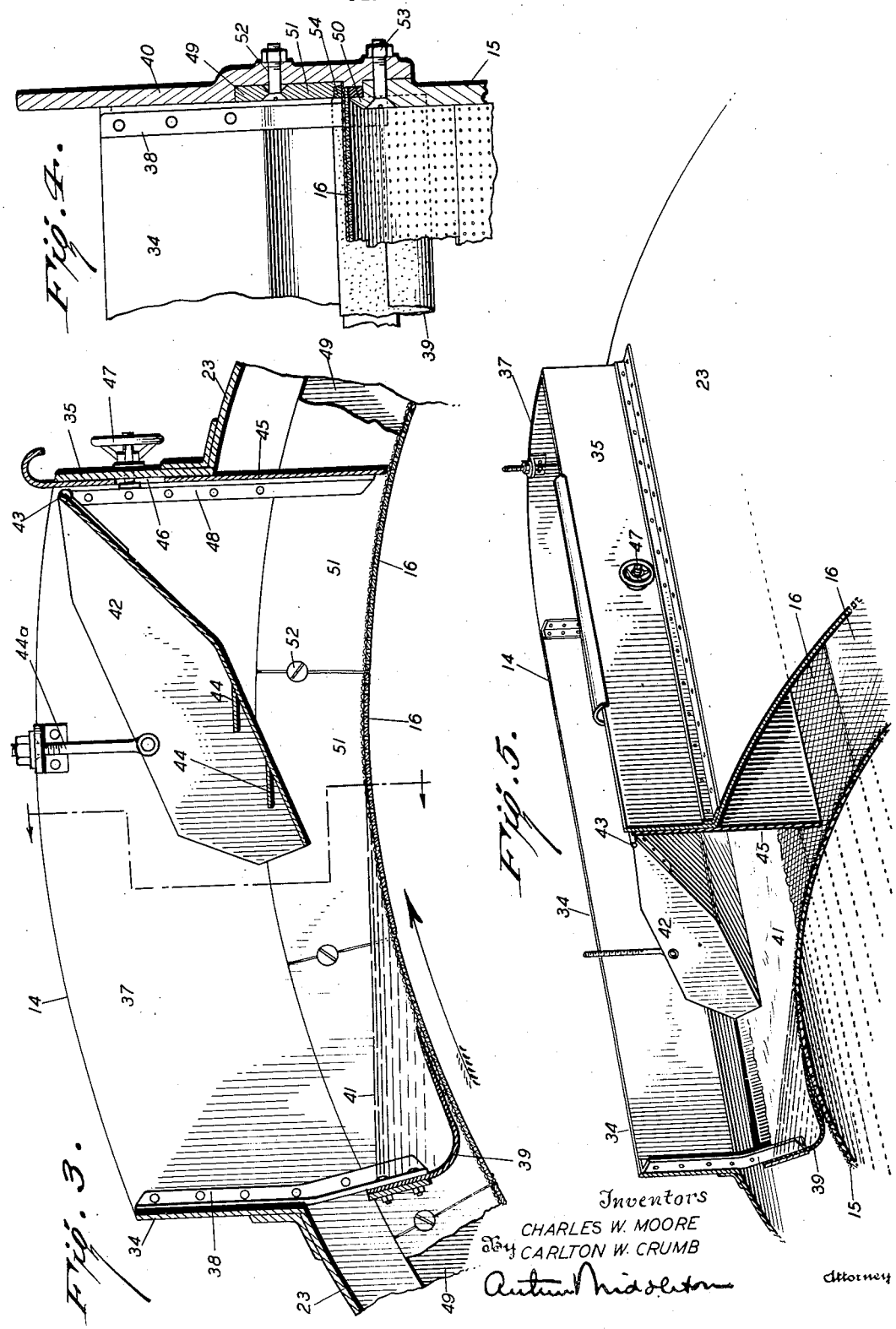

Patented Jan. 16, 1934

1,943,618

UNITED STATES PATENT OFFICE 1,943,618

DRYING FILTER

Charles W. Moore, St. Clair, and Carlton W. Crumb, Detroit, Mich., assignors to Oliver United Filters Inc., San Francisco, Calif., a corporation of Delaware Application January 4, 1932. Serial No. 584,650

3 Claims. (Cl. 210—199)

This invention relates to continuous filters but it has especial reference to providing a filter with means whereby it can not only carry out the function of filtration but also that of drying.

The object of the invention is to devise a filtering mechanism which filters the material to be treated therein by squeezing or draining the liquid therefrom, such as by differential pressure and then removes from the filter cake, the moisture still remaining therein which is not ordinarily separated therefrom by the squeezing action of filtration.

It has been found that in general the act of filtration removes from the material being filtered the greater part of the liquid from the interstices between the solids, but that filtration and the squeezing or pressing or compacting which comprises the act, never removes the thin film or envelope of liquid which encases or encloses each solid particle that has been in submergence or suspension.

This liquid film enveloping each particle successfully withstands filtration. Filtration removes the free water present in the mass of solids but not the enveloping or adsorbed film. Therefore, it is the aim of this invention to so treat the particles to be filtered and dried that their adsorbed water is effectively removed as well as the free water there-between.

The nature of this invention may be said to be the provision of a drying gaseous medium confined above a travelling filter cake in such a manner that all of the drying gas or air is compelled to pass through the cake in large volume but a low pressure. The drying medium or gas is selected so that it will have the characteristics of (1) lessening the surface tension of the particle-enveloping adsorbed liquid film; (2) of lowering the viscosity of said film; (3) of thinning that film so its rupture is easily accomplished; (4) of expanding the particles toward each other so that the interstices between adjacent particles are closed whereby a compressive and disruptive force is exerted on the liquid films between adjacent particles; (5) of having a maximum absorption action upon the liquid to remove from the particles the adsorbed film as soon as it is ruptured; and, (6) of causing an acceleration of drainage of liquid from the solids.

In drying granular or flocculated solids commercially, it is customary to treat them in a rotating drum dryer wherein the solid particles are caused to fall through a hot and drying atmosphere. In this form of dryer, there are very definite limits to the possible velocity of the particle passing through the drying air. By the use of this invention, drying air has been drawn through a bed of solids or filter cake at speeds up to 300 ft. per minute.

Drying air has also been drawn through the filter cake in quantities up to 300 cu. ft. per minute per square foot of filter cake surface. Small volumes of heated air will not produce the desired effects. Hot air in passing through the filter cake causes evaporation of some of the moisture in the cake. Evaporation involves transference of latent heat from the air to the moisture. And heat transference from the air means that it has its temperature materially lessened. Cool air will not produce the effects required as above enumerated, so sufficient volumes of heated air must pass through the cake to prevent evaporation from having any substantial cooling effect upon the heated air in the hood confining it over the filter cake. Naturally, the volume of air to be passed through the cake will vary with the specific kind of cake being treated but in general the volume of air used must be sufficient to meet these requirements.

It has been proposed before to place a hood over a filter medium but due to the rapid cooling of the heated air therein and the water vapor picked up by the air, some means had to be provided of letting some of this cooled and moist air pass out from the hood instead of going through the filter cake. It has also been proposed to dry the cake by radiated heat. But neither of these proposals embody the features of this invention. Hot air must pass through the cake on its traveling carrier from a hood wherein all the air in the hood is compelled to pass through the cake, and where enough air is used so that its saturation point is never reached nor its temperature substantially lowered.

In this way drying action which meets all of the above described requirements can be produced much more effectively and quicker than it has been found possible to do in any other manner.

Since it is proposed to use large volumes of heated air under low pressure, it becomes desirable to expose the filter cake to the drying air over as long an interval as possible of its cycle of travel while on the filter medium, so to that end, the invention contemplates as one embodiment thereof a traveling filtering conveyor, preferably in the form of a rotary drum filter provided with the filter feed being applied to the top of the filtering conveyor through the medium of a feed hopper. This change of location of the feed to the top of the filter instead of being applied as is usual to the filter in the form of a bath at the bottom thereof, has several advantages. It is desired sometimes to dry pulps which are not capable of being sucked up by a filter in traveling through a bath of pulp to be filtered. By feeding such pulps, of heavier and larger solids like coal, to the top of a filter, this difficulty of pick-up is overcome. A top feed filter permits gravity to aid in the formation of cake on the filter drum where in other types, gravity works against cake-formation. Further, placing the feed at the top of the filter drum permits exposing the filter cake on the drum to the drying air through a much greater number of degrees of rotation of the drum than is otherwise possible.

In order to assure the proper handling and control of the large volume of heated air, the arrangement and size of the means for discharging from the filter drum must be large enough to handle the air which has passed through the filter cake to dry it. Therefore, the air discharge conduit from the drum is very definitely correlated to the volume of air to be handled. In the same manner, the interior construction is devised and correlated to handle the desired large volumes of heated air.

By increasing the length of exposure of the filter cake to the drying atmosphere, space is offered to use a succession of doctor or scraper blades for progressively removing successive layers of the filter cake from the drum. The outer surface of the cake tends to dry first, so as soon as dried, that part or layer that has dried can be peeled or scraped off by a first scraper blade. As the newly exposed layer becomes dry it can be scraped off or removed by a second scraper blade, etc.

This arrangement offers a further opportunity of treating the cake progressively and successively to change its physical or chemical nature. For instance, if it is desired to calcine the filter cake, heat can be applied thereto while it is yet on the drum to calcine a top layer of the cake, and the finished layer can be removed to expose another layer to calcination and so on, whereas otherwise it might be impracticable to get sufficient heat to pass through the already calcined layer.

The top feed arrangement requires a specific form of treatment for the feed because it has been found that certain materials to be filtered cannot be successfully applied directly to the filtering surface. Some types of solids to be filtered must be in suspension when the filter begins to act upon them. Other types of filtrant must be evenly distributed over the filter drum. Therefore, this invention proposes to create and maintain on top of the filter drum, within or adjacent to the feed hopper, a reservoir or pool of filtrant. Guide means may be provided to assure all incoming solids in the filter feed shall pass into the pool on top of the filter drum before they are acted upon by filtering action.

Again, there are other materials to be filtered which contain no flowing liquid and are not fluid of themselves. It is desirable even in such cases to maintain a reservoir or supply of filtrant on the filter drum in the feed hopper in order to more evenly distribute the filtrant over the surface of the filter cells on the drum. Where non-fluid filtrant is treated, means are provided to prevent the formation on the filter cells of too thick a cake.

Also comprehended by this invention is the provision of a particular manner of removably maintaining each filter cell or section in place on the filter drum whereby its retaining devices will not reduce the effective filtering area of each cell.

The manner of carrying out this invention has been illustrated in the accompanying drawings which show an embodiment of the invention which is the best of which we are at present informed.

In the drawings Figure 1 represents a side elevational view of the filter embodying this invention used for the purpose of illustration. Fig. 2 is an end view. Fig. 3 is a vertical sectional view taken thru the feed hopper of the filter. Fig. 4 shows a detail of construction and is taken along the line 4—4 in Fig. 3, while Fig. 5 shows a perspective view of the filtrant pool maintained in connection with the feed hopper. Fig. 6 shows a vertical longitudinal sectional view taken through the interior of the filter with its casing and hood removed.

The filter embodying this invention illustrated in the accompanying drawings composed of a supporting frame 11 and an enclosing casing 12. The casing is provided with a bottom cake receiving hopper 13 and a top feed hopper 14. Within the casing 12 is a traveling or rotatable filter cake supporting drum 15 having filtering section units or cells 16 which are provided in the usual manner with means for forming a cake thereon. The drum 15 is mounted on a shaft 17 which extends through the casing 12 and is adapted to be rotated by means of a motor 18, a variable speed device 19, a speed reducer 20 and a suitable drive 21 from the speed reducer to the shaft 17 which is suitably journalled. Drum 15 is provided with a hollow trunnion 22.

It is desired to have the drum rotate in an atmosphere of heated drying air or other fluid medium so to that end a part of the casing 12 is made into a hood 23 surrounding the drum which confines the heated air. The air is forcibly fed to the hood 23 through an air inlet 24 but no outlet for the air is provided in the hood. The hood therefore confines the air around the drum so that the only escape for the air is through the filter cake on the drum. When the air passes through the filter cake it is drawn into the hollow interior or interior passages of the drum and passes out therefrom through the casing around the trunnion 22 and through a conduit 25 to a separator 26 wherein the liquid filtrate is separated from the air. The separated liquid flows through a barometric leg 27 from the separator 26 into a suitable seal tank or tray 28. The tray may be formed with a weir 29 therein to form a liquid seal 30 of filtrate. The filtrate overflows the weir 29 into a pump sump and passes out from the container through pipe 31.

The upper part of the separator 26 has a further pipe connection 32 to convey the heated air to discharge. 33 represents a washing shower or spray for use in connection with cleaning the filter casing 12 when the filter is not in operation.

One aim of the invention is to expose filter cake while in place on the drum to an atmosphere of drying air through as great a part of the path of travel of the drum as is possible. To that end the material to be filtered is fed to the top of the filter drum instead of having the drum pass through a path of filtrant at the bottom thereof as is usual. By having the filtrant fed to the top of the drum it is possible to have cake on the drum during 270° or more of its rotation. This top feed arrangement also permits this filter dryer to handle certain pulps which cannot be picked up against the action of gravity by a drum operating in a filtrant bath below the drum.

The manner by which the filtrant is fed to the drum is by means of a top feed hopper 14 having preferably a rectangular hopper provided with a front edge or wall 34 and a rear edge 35 with sides 36 and 37 respectively. The hopper 14 is not centered on the vertical center line of the filter but is set slightly in advance thereof in the direction of the upwardly moving part of the filter drum.

In the front edge 34 of the hopper is provided a frame 38 from which depends a strip, apron, dam or gasket 39. This may be flexible as made of rubber, or it may be of wood or of metal. If made flexible, it is desirable to have it long enough to lay upon the drum 15 and extensive enough to form with the drum flanges a reservoir or pool 41 of filtrant which is maintained upon the top of the filter and more or less within the outlines of the hopper 14. The dam 39 is spaced from the hood 23 so as not to interfere with the passage of hot air around the drum.

In order that all of the material fed to the filter may be directed to the reservoir or pool 41 of filtrant so that all solids are sure to be in suspension before the filtering action of the filter cells 16 operate on them, and also to be well distributed over the filter cells a deflecting guide 42 is provided in the hopper, preferably pivoted at 43 and means 44ª are provided for adjustably maintaining the angle of the guide 42 to properly direct the filter feed to the pool 41. The deflecting action of the guide 42 may be emphasized by the deflecting fingers or strips 44 set up from the bottom of the guide 42.

Certain pulps, however, may be required to be filtered which have no flowing liquid therein or which have little fluidity of themselves. Such pulps when fed to the filter through the feed hopper 14 are so viscous or slow flowing that their tendency is to form too thick a cake upon the filter cells 16. Under such conditions it is necessary to scrape off the excess thickness of cake. This may be done by the use of a scraper blade 45 adjustably held on the back edge 35 of the hopper by means of a slot 46 and a screw 47. The scraper blade is held in proper relative position by means of guide strips 48. The proper thickness of cake can thus be controlled by the raising or lowering of the scraper 45 and it can readily be maintained in adjusted position by tightening up the screw 47. However, it is desirable, even with viscous or non-liquid pulps to maintain a reservoir 41 thereof on the drum in the hopper.

In view of the fact that there can be much less volume maintained in the pool 41 of filtrant on top of the filter than can be in the usual bath or basin of filtrant in which present day filters operate, it is necessary to so secure the filter cell or medium 16 in place on the drum that the means for securing them will not diminish their effective filtering area. To that end, there is provided a recess 49 in the flanges 40 of the drum. The filter cell or medium extends into that recess, as shown in Figure 4 and is supported therein by means of a gasket 50. The filter medium is then clamped in place in the recess 49 by means of a plate 51 formed of a size and shape to neatly fit into the recess 49. The plate is then removably held in place by bolt and nut arrangement 52.

In the preferred form the flange 40 is secured to the drum 15 by means of a nut and bolt 53 as shown in Figure 4. In order not to damage the filter medium a further gasket 54 may be interposed between the plate 51 and the filter medium 16. If one filter cell 16 becomes damaged and needs to be replaced, it is only necessary to remove one bolt 52 and one plate 51 on each side of the drum whereupon the damaged cell can be removed and replaced as the width of the individual cell and the length of the corresponding plate 51 are co-extensive.

Under certain circumstances it is desirable to remove successively layers of filter cake as fast as it is in finished condition. To that end there is provided extending through the casing 12 several doctor blades or scrapers 55, 56 and 57 which coact with the filter cake on the drum. Suitable means are provided exteriorly of the casing to control adjustment of the doctor blade toward and away from the drum. These means are indicated more or less diagrammatically at 58, 59 and 60 respectively.

61 represents a hand-hole on the casing 12 for inspecting the character of filter cake being formed on the drum while 62 represents a cake discharge aperture or opening from the cake discharge hopper 13.

Referring more particularly to the arrangement for removing from the drum air which has passed therein through the filter cake, it can be seen from Fig. 6 that the drum 15 is provided funnel-like ducts 63 leading from the filter medium or cell 16 out through the side of the drum by means of a lateral extension of the funnel-like duct 63 which merges into and connects with the conduit 25.

The filter drum shown herein is sectionalized by having thereon a plurality of independent filter cells 16. The invention may of course be carried out on unsectionalized filter drums or conveyors but in the present case if a sectionalized drum, an air discharge duct 63 is provided for each filter cell 16. Thus all air passing through filter cake on a cell is conducted (as shown by the arrows in Fig. 6) to discharge from the filter drum independently of other air discharges and without disturbing or interfering with the air discharge from adjacent or other filter cells.

The front wall 65 of the duct 63 is streamlined and the rear wall 66 is likewise but with particular emphasis being given to curving the rear wall around and out of the annular opening of the filter drum. The object of this streamlining is to prevent the formation of eddy current which might interfere with the free and unobstructed discharge of air from the filter. Side walls 67 or divisional walls may be supplied between adjacent ducts 63 to make each duct independent of the other as above described.

The lateral extensions 64 of ducts 63 are arranged around the trunnion 22. By being annularly placed thereabout, sufficient space is provided therebetween for the trunnion.

Operation

The material to be filtered is fed to the filter through the feed hopper 14. If the material to be filtered has no free liquor, a quantity or reservoir of it is maintained in the hopper as indicated by the pool 41, for the purpose of getting good distribution thereof over the filter cells 16. If the pulp to be filtered contains liquid, it is fed to the filter by flowing it down the deflecting guide 42 which has been suitably adjusted to direct the material to be filtered into the pool or reservoir of filtrant 41 in the hopper so that all solids in the fluid filter feed will be in suspension at the time that filtering action takes place upon them through the medium of the filter cell 16. The apron, strip or dam 39, which is preferably curved flexible and made of rubber (although it may be a rigid dam) is held down upon the filter cells partly by the weight of the pool thereon and partly by its own springiness so that a substantially liquid type seal is made between the strip 39 and the cells 16 even though the cells 16 move upwardly thereon. Rotation of the drum 15 with its cells 16 act upon the filtrant pool 41 to cause the formation of filter cake on the cells and this cake is then carried around on the drum by rotation of the drum. If the material to be filtered has no free liquor, the proper thickness of the cake on the drum can be controlled as it passes away from the hopper by means of the cake thickness controlling scraper 45 as previously described. If this problem of cake thickness controlled is not presented by a particular kind of material to be filtered, the cake scraper can be withdrawn from effectiveness and left adjusted out of use.

As the cake on the filter cell is carried around in the confined atmosphere of heated air in the hood 23, the hot air passes through the cake from whence it is eddylessly conducted by ducts 63 from the filter out drum and through the discharge conduit 25.

This passage of heated or other fluid medium through the cake is for the purpose of removing from the cake the water not removed by filtration which remains on each solid particle of the cake in the form of an adsorbed liquid envelope. This water is held thereon by surface tension and in some cases also by capillary attraction. The air is caused to pass through the cake in large volumes at low pressure as above described using the principle of low vacuum and high displacement. The air used is of sufficient temperature to lower the viscosity of the adsorbed liquid envelope around each solid particle to thin it out to a point where the envelope is ruptured and continued passage of the air through the cake then drains the water of the ruptured envelope into the interior of the filter drum and carries it away.

The temperature of the air is also such that it will have maximum adsorptive properties so that the liquid envelope has a number of forces operating on it. It will not only be thinned out to the point of disruption but there will be a battle between the adsorption forces and the absorption forces. The air must also be hot enough to heat up the cake to expand its particles whereupon expansion of the particles will lessen the size of the interstices therebetween so that the coming nearer together of the particles due to their increased size, will have still another force acting to disrupt the liquid envelopes, namely, the squeezing action.

Only enough pressure or head is used on the heated air to cause any leaks through the hood 23 to be outwardly therefrom instead of inwardly. If the leaks were inwardly, cold air would enter which would have an undesirable cooling effect upon the heated air. The volume of heated air used is such that losses of heat by the air due to evaporation thereof of moisture in the filter cake are insufficient to materially lessen the temperature of the air in the hood 23. If the air in the hood has its temperature lessened materially or substantially, it immediately becomes moist and if its temperature continues to fall, it will become saturated with moisture. Moist air will not naturally pass through the filter cake. And if by chance it could be forced through, it would have no drying effect thereon. Therefore, the necessity is apparent for passing through the hood and the cake sufficient volumes of air to prevent cooling of the air in the hood.

Another factor enters into determination of the volume of air to be passed through the cake and that is the number of B. t. u.'s required to properly dry the particular kind of cake being treated. In order to accomplish the steps necessary to proper drying, it can be calculated about how many B. t. u.'s are necessary to carry off the adsorbed moisture in the cake.

Then the character of the cake is to be considered as to how much temperature it can withstand. Coal, for instance, will begin to burn if too high temperatures are used. But in general, it is desired to use as high a temperature as can be used practically on the cake. Next to be considered is the pressure to be used. Some cakes are more or less porous like coal. On such cakes, little pressure need be used to get the air through the cake but other cakes, such as cement require higher pressures, although it is not contemplated to use more than 3 or 4 inches of vacuum for the pressure created. Thickness of cake also controls to some extent the pressure to be used, for naturally a thicker cake will require more pressure to get the air through it than a thinner cake. Meanwhile, it is desired to use the smallest size filter to do the work so the filter area is another factor entering into our calculations. But when the various factors have been determined, they are used to supply the answer to the question of how much volume is required.

And the final but very important feature encountered is the correlation of air discharge from the filter to permit of the proper functioning of the air. Such large volumes of air may be used by the filter-dryer of this invention that particular attention must be paid to the air-discharge arrangements. This relates to the interior arrangement of the filter whereby the air passing through the cake will pass out from the drum uninterruptedly with no disturbing eddy currents and wherein it will encounter no resistance to its facile discharge.

The air passing through the cake is conducted by the ducts 63 from the filter cells 16 to the discharge conduit 25 in a manner that no sharp corners are turned by the air and that the cross-sectional area of the ducts 63 and conduit 25 is at all times sufficiently large to prevent the setting up therein any back pressure which might interfere with the free passage of the air therethrough.

There is a tendency of the heated air to dry the top layer of the filter cake to a greater extent or more rapidly than the inner portions of the cake. It is therefore desirable to remove the dried layer of the cake as soon as it has been sufficiently dried while leaving the undried layers still on the drum to be further exposed to the complex actions of the heated air. To that end the doctor blade or scraper 55 is so adjusted that it scrapes off or peels off the dried layer of the filter whereupon the next layer is exposed to the drying air. When it dries the newly exposed layer, that layer is scraped off by the doctor blade 56 and the successively exposed new layer of filter cake is finally scraped off by the doctor blade 57. The removed cake falls into the hopper 13 from which it may be discharged through the opening 62.

The arrangement of this filter makes possible progressive treatment of the cake which may go so far as to change its physical or chemical characteristics. For instance, one zone in the hood may be heated far in excess of a preceding zone so that the cake after being filtered and dried may be exposed to some other action such as calcination.

The heated air and the filtrate are emitted from the interior of the drum 15 through the ducts 63 carried by the filter drum and pass through the conduit 25 to the separator 26. In this device the liquid filtrate descends through the pipe 27 to the container 28 whereas the air passes through the conduit 32 to discharge.

It will thus be seen that this invention is capable of embodiment in a filter wherein solids while being carried by a travelling support may not only have their free water removed therefrom, but they may have the adsorbed liquid envelopes removed from the solid particles of the filter cake whereby the ultimate product is much drier than has ever been obtained before in a filter mechanism.

The invention is capable of other embodiments and of course the details of construction shown herein for the purpose of illustration can obviously be modified and changed without departing from the spirit and scope of the appended claims.

We claim:

1. Filtration apparatus comprising a rotary filter drum, an enclosing casing therefor open at the top to uncover the zenith of the drum, a feed hopper carried by said casing forming the boundaries of said opening having upstanding side walls, means depending from one of said walls for maintaining a pool of filtrant on top of said drum but to the rising side of the zenith thereof, and an inclined filter feed deflector supported from one of said walls for feeding filtrant to said pool in a direction opposite to the rotation of said drum.

2. Apparatus according to claim 1 with the addition of means for changing the angle of said deflector with respect to said pool.

3. Apparatus according to claim 1 with the addition of a scraper element supported from said hopper for rejecting from rotation with the drum excess of filter cake and holding it upon the moving drum in the zone of the hopper.

CHARLES W. MOORE.
CARLTON W. CRUMB.